June 11, 1929.
W. E. TRENT
1,716,673
GAS MANUFACTURE
Filed March 8, 1922
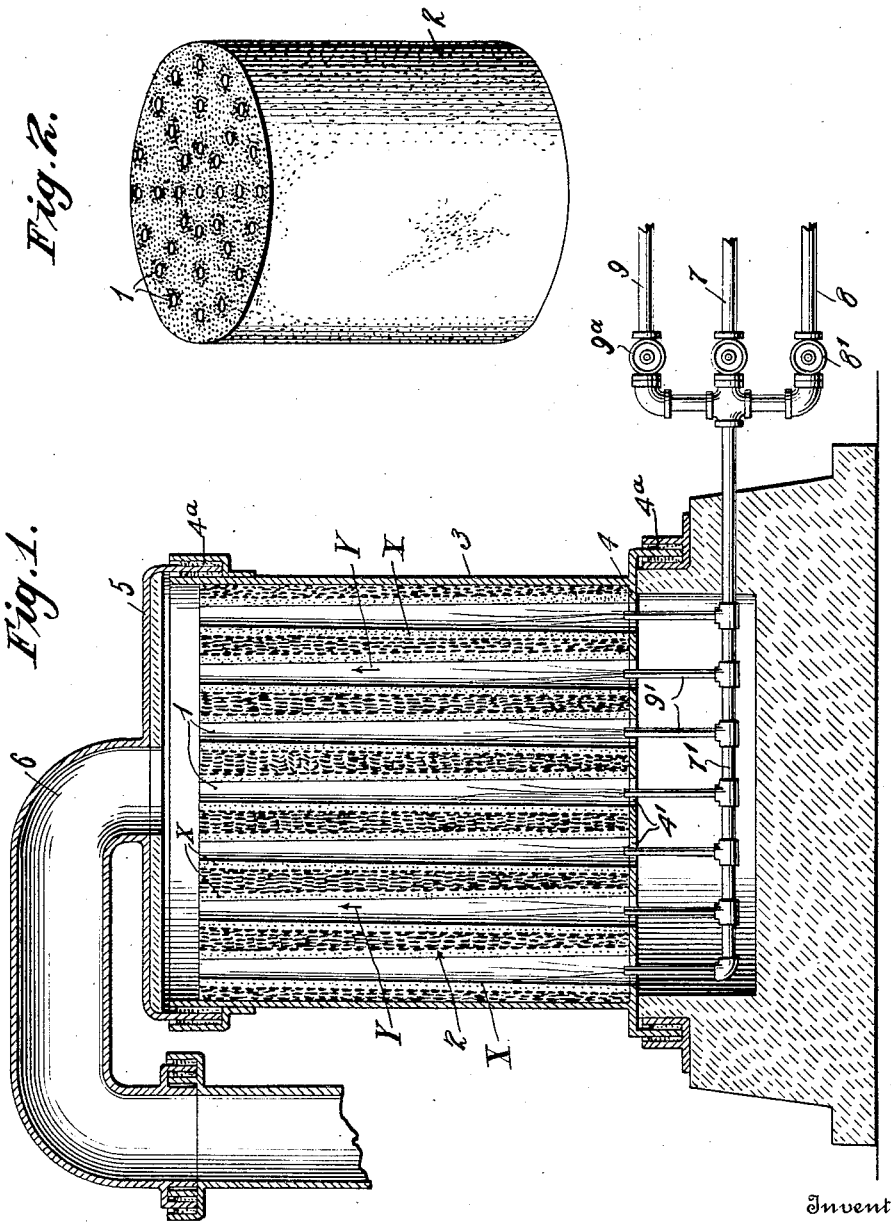
Inventor
Walter E. Trent
By Charles M. Thomas
Attorney Patented June 11, 1929.

1,716,673

UNITED STATES PATENT OFFICE.

WALTER EDWIN TRENT, OF WASHINGTON, DISTRICT OF COLUMBIA, ASSIGNOR TO TRENT PROCESS CORPORATION, OF WASHINGTON, DISTRICT OF COLUMBIA, A CORPORATION OF DELAWARE.

GAS MANUFACTURE.

Application filed March 8, 1922. Serial No. 542,061.

The invention relates to the art of gas manufacture.

It is a primary object of this invention to manufacture gas from a fuel mass or charge through which passages have been formed so as to provide a large area of internal heating surfaces and gas discharge openings from all parts of the charge. In accordance with the invention, the openings are spaced so as to reduce to any desirable minimum the distance that the heat has to penetrate to the interiors of the mass between adjacent openings, thereby greatly accelerating the gas making operation.

My invention contemplates the introduction of heat to the openings formed in the charge, either by burning all or part of the mass around said openings to incomplete combustion, or by admitting previously heated gases that travel through the openings and impart their heat to the walls thereof to heat the charge and vaporize the volatile content, thereby forming additional gases that commingle with and enrich the heat carrying gases. When the invention is practiced in the manner as first mentioned, that is, where a part of the charge is burned an enriched producer gas is made. In the latter embodiment of my invention wherein the volatiles are vaporized by the application of superheated gas to the charge, I produce a gas which is after the type of an enriched or carburetted water gas.

In accordance with this invention when producer gas is to be manufactured, the generation of heat takes place within the fuel mass or charge by admitting a controlled supply of air after the charge has become ignited and in burning all or part thereof to incomplete combustion. When the process is practiced for the enrichment of heated gases, such as water gas, the hot gases pass through the passageways or openings in the charge, vaporizing the volatile content of the charge forming additional rich gases that commingle with the heating gases and leaving a carbonized residue which may be removed and used as a fuel.

When using a fuel charge having a plurality of passageways therein the heat applied penetrates the portions of the charge between passageways, and the vapors therefrom escape to the passageways. I have discovered that the carbonaceous material adjacent the walls of the passageways is of a higher temperature than other portions of the charge and these vapors must therefore pass through the hot carbonized material surrounding the passageways. This causes a cracking of the volatiles, converting them either into low boiling point fractions, such as motor spirits where the temperature is kept low, or into fixed gases where a high temperature exists in the carbonized zones. The evolved gases after passing through the hot carbonized zones enter the passageways and encounter the highest temperatures to which they are subjected during their travel through the passageways where a further cracking or fixation of gas takes place.

Gas, as manufactured by existing methods contains excessive quantities of tars, lamp black, and the like, which are usually removed from the gas by scrubbing and condensing. I have found that in the practice of my method the passing of gases through the hot carbonized material surrounding the passageways causes the tars carried therein to be broken up into light vapors and gases, and any carbon resulting from this treatment is deposited with the hot carbonized material surrounding the passages and serves to bind the carbonaceous charge, thus both increasing the amount of and purifying the gas, and further increasing the density of the carbonized product. Where non-coking coals or poorly coking coals are being gasified, the deposited carbon often serves as a sufficient cementing agent to form a desirable and useful coke.

In the accompanying drawings I have shown one manner in which my invention may be carried into use, but obviously gas can be manufactured from any desirable type of apparatus by this method.

In the drawings Figure 1 represents a vertical cross sectional view of a gas making retort with a charge therein; and, Figure 2 is a perspective view of a preformed and bonded fuel mass or charge before it is introduced to the retort.

When gas is to be manufactured in accordance with my invention, I preferably take finely crushed coal, coke, or the like, which may be of 10 mesh fineness or finer and mix with the same an oil, water, or any other suitable binding agent, preferably in sufficient quantity to form a plastic mass. In actual practice I have successfully used one part oil to approximately five parts comminuted coal by weight, which has been found to form a very desirable plastic mass.

The mass is then introduced into a container, mold, or the like, and by the use of mandrels or equivalent means, I form therein a plurality of passageways 1. The mass may then be removed from the mold and constitutes a preformed bonded charge as indicated at 2 suitable for introduction to the gas making retort. These passageways may be of any configuration and may be spaced apart various distances in the charge. The binder serves to maintain the passageways in the charge 2 when the same is inserted in a gas making retort.

A gas making retort into which the bonded charge 2 is inserted is designated by the numeral 3. The charge rests at its lower end upon the grate 4 provided with openings 4' aligning with the openings 1 in the charge. The retort also receives at its upper end a cap-shaped closure 5 provided with a gas outlet 6. The edge of the closure fits into a water seal 4ª, thereby effecting sealing engagement with the gas making retort. A similar slot may also be provided for effecting sealing engagement of the side walls of the retort with a supporting base.

In manufacturing producer gas I introduce into the retort containing the bonded mass or charge 2 a combustible mixture of gaseous fuel and air, initiate combustion thereof, and continue to supply such mixture and burn it until the fuel mass or charge 2 has become ignited, when the supply of the gaseous fuel may be cut off while the introduction of air in amount sufficient to support partial combustion of the ignited fuel mass is continued. In the accompanying drawings reference character 7 indicates a valve controlled gaseous fuel feeding pipe leading to a supply manifold 7' with which the burners or feeding jets 9' communicate for introducing the desired gas or gaseous mixture through the openings in the grate 4 and directly into the passageways 1 of the fuel mass or charge. An air feeding pipe 8 also communicates with the manifold 7' for delivering air through the nozzles 9' to support combustion of the gaseous fuel introduced through the pipe 7 during the initial heating step, as well as after ignition has occurred for burning the charge to incomplete combustion. A valve 8' controls the air feeding pipe. In my apparatus I have also shown a superheated gas feeding pipe 9 communicating with the manifold 7' and controlled by a valve 9ª for the purpose of admitting superheated gases to the generator for purposes to be later described.

After a charge of the comminuted carbonaceous material and its binder has been molded or formed into a product of the nature of the product shown in Figure 2, and if producer gas is to be manufactured from such product I place a preformed charge in the retort 3 and admit fuel gas through the pipe 7 and air through the pipe 8 to ignite the carbonaceous material in the charge. After ignition occurs the supply of fuel gas through the pipe 7 is cut off, and air is then introduced to the passageways 1 in the charge through the pipe 8 and jets 9' for causing a burning of all or part of the charge by incomplete combustion. The provision of the openings greatly accelerates the gas making operation, in that a rapid consumption of the fuel takes place by reason of the maximum heating surface and a practical minimum distance of heat penetration of the mass between the passageways. The generated heat vaporizes the volatiles as it penetrates the charge and the carbonaceous fuel becomes very hot and carbonized around the passageways 1 as indicated by the reference character X.

As the heat penetrates the material between adjacent passageways the volatiles are of course gasified and vaporized, and these gases and vapors pass through the hot carbonized zones X surrounding the passageways 1, and then into said passageways and upwardly therethrough in the direction as indicated by the arrows Y for escape and discharge through the exit 6. As the gases and vapors pass through the hot carbonized material around the passageways, the vapors are cracked into their low boiling point fractions, such as motor spirits, or are converted into fixed gases or both, depending upon the temperature of the carbonized material surrounding the apertures. This temperature is under the control of the retort operator by a proper manipulation of the air supply and may be varied at will at any time.

The volatiles from the carbonaceous material contain a material quantity of tars, lamp black, and the like. Under the existing practices of gas manufacture, these volatiles are treated by scrubbing and condensing to remove such undesirable substances therefrom. I have found that when gas is manufactured in accordance with this invention, the passage of the vapors carrying the tars, lamp black, and the like, through the hot carbonized zones X surrounding the passageways 1 results in a breaking up by cracking of the tars into light vapors and gases. Any precipitated carbon also adheres to or is deposited with the carbonized materials X before the gases permeate this material and enter the passageways 1, the carbon becoming a permanent part of the hot carbonized mass. This carbon has desirable characteristics of acting as a binder for the carbonized material so that when poorly coking coals, or non-coking coals are being used for gas making, the precipitated carbon acts as a binding or cementing agent to form a useful and durable coke. When producer gas is being manufactured the supply of air is continuously admitted to the passageways 1 until any desired portion of the charge is gasified, and if a residue consisting of carbonized material is left within the retort, the same is discharged and a new gas making charge placed within the retort.

The invention also contemplates the application of previously heated gases to a contained charge 2 through the pipe 9 and the valve 9ª for the purpose of transmitting the heat of the gases to the walls of the passageways 1 of the charge to vaporize the volatiles and form additional gases which commingle with and enrich the heating gases. The provision of the passageways of course lessens the requisite distance of heat penetration when such a practice is followed and materially accelerates the gas making operation. This practice is decidedly advantageous as a means for forming enriched or carburetted water gas. In such an event the water gas is introduced to the retort from a water gas generator or heated to the desired temperature and instead of being passed through the usual water gas carburetor would be admitted through the pipe 9 and the valve 9ª into 7' and discharged through the nozzles 9' into the passageways 1 of the gas making charge. The heated gas directly contacts with the walls of the passageways 1 and vaporizes the volatile constituents in the mass. The rich gases thus produced commingle with the heating gas, carburetting the same and pass out through the discharge opening 6. The residue of the charge then consists of a carbonized or coke product which can be discharged from the gas retort and used for any suitable purpose.

Having thus described my invention, what I claim is:

1. A process of manufacturing enriched producer gas, comprising forming comminuted fuel and a binder into a bonded mass, forming in said mass a plurality of open passageways extending therethrough, igniting the fuel forming the walls of said passageways, supplying air to such ignited fuel to cause incomplete combustion thereof and to distill volatiles therefrom to form enriched producer gas, and collecting the gas thus formed.

2. A process of manufacturing gas, which comprises forming a mass of coal into a bonded charge with a plurality of open passageways penetrating the mass, introducing the charge into a retort, applying heat to said mass by burners in register with said open passageways and directing heating gases against the walls thereof to vaporize and gasify volatile constituents, and collecting said volatiles in admixture with said gases.

3. A process of manufacturing producer gas, which comprises forming a mass of coal into a bonded charge, forming in said bonded mass a plurality of open passageways extending through the mass, introducing the charge to a retort, applying heat to the walls of said passageways by burners in register therewith and directing combustion gases therethrough to vaporize and gasify volatile constituents, the heat applied to the material forming the walls being sufficient to carbonize said material and to subject gaseous products generated from material between adjacent passageways to a cracking temperature as they pass through said carbonized walls, and collecting said volatiles in admixture with said gases.

4. A process of making producer gas from comminuted fuel, comprising forming the fuel into a bonded mass having a plurality of unobstructed open passageways extending therethrough, introducing said mass to a retort, applying heat to the walls of the open passageways by burners disposed within the retort for directing combustion gases against said walls to initiate combustion of said mass and distill and gasify volatiles therefrom, and collecting said volatiles in admixture with said combustion gases.

5. A process of making producer gas, comprising forming comminuted coal and oil into a bonded mass having a plurality of open passageways therein, introducing the mass into a retort, and applying heat to the walls of said passageways by burners registering with, and distributing combustion gases in said passageways thereby forming producer gas.

6. A process of manufacturing gas, which comprises forming a mass of coal into a bonded charge with a plurality of open passageways penetrating the mass, introducing the charge into a retort, directing heated gases through said passageways and against the walls thereof to vaporize and gasify volatile constituents, and collecting said volatiles in admixture with said gases.

7. A process of manufacturing gas, which comprises forming comminuted coal and oil into a bonded mass having a plurality of open passageways therein, directing heated gases through said passageways and against the walls thereof to vaporize and gasify volatile constituents, and collecting said volatiles and gases in admixture with said gases.

In testimony whereof I affix my signature.

WALTER EDWIN TRENT.